June 26, 1923.
H. C. STRUCHEN
HOIST FOR VEHICLE BODIES
Filed July 12, 1920
1,459,935
2 Sheets-Sheet 1
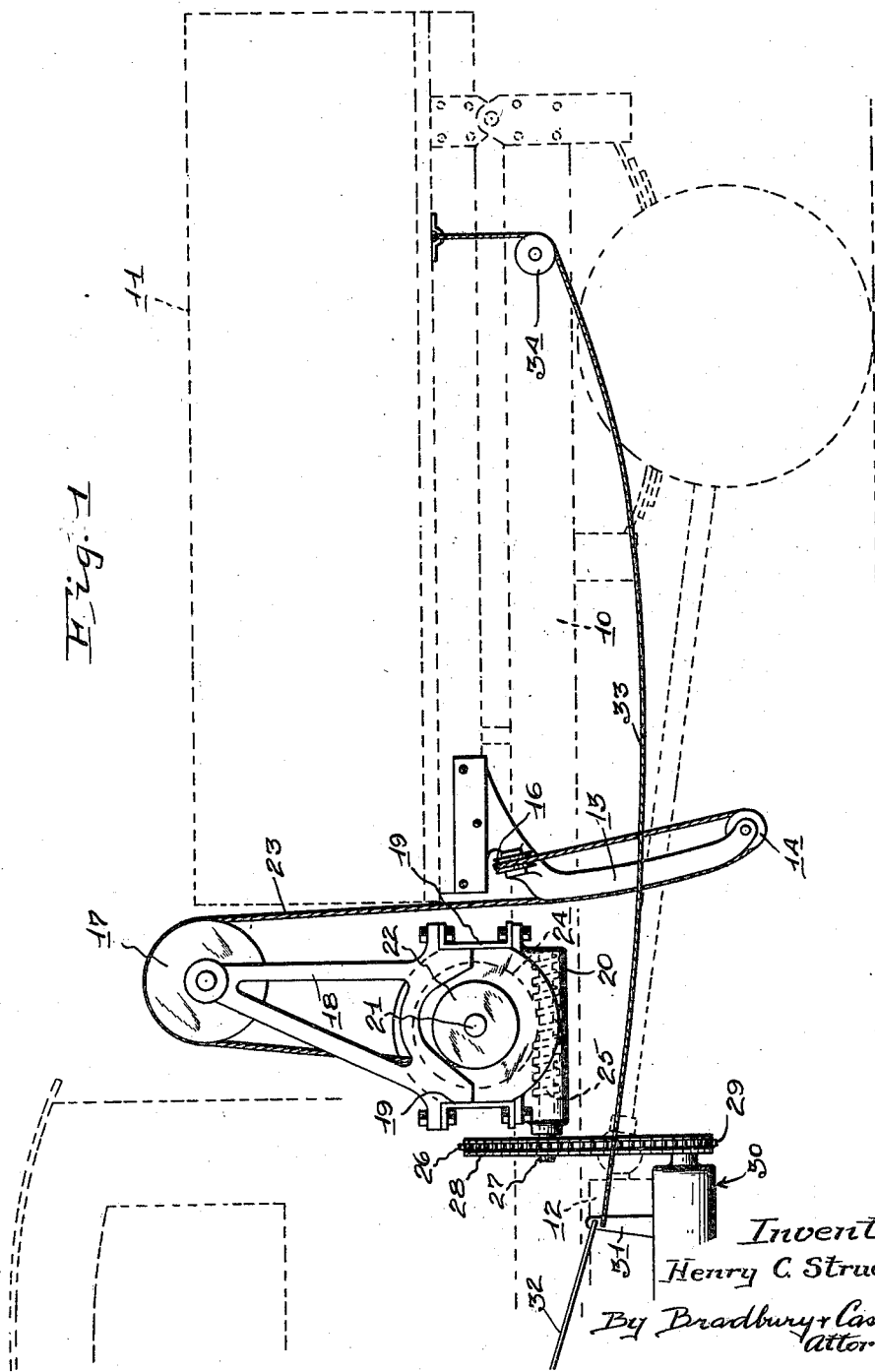
Inventor
Henry C. Struchen
By Bradbury & Caswell
Attorneys

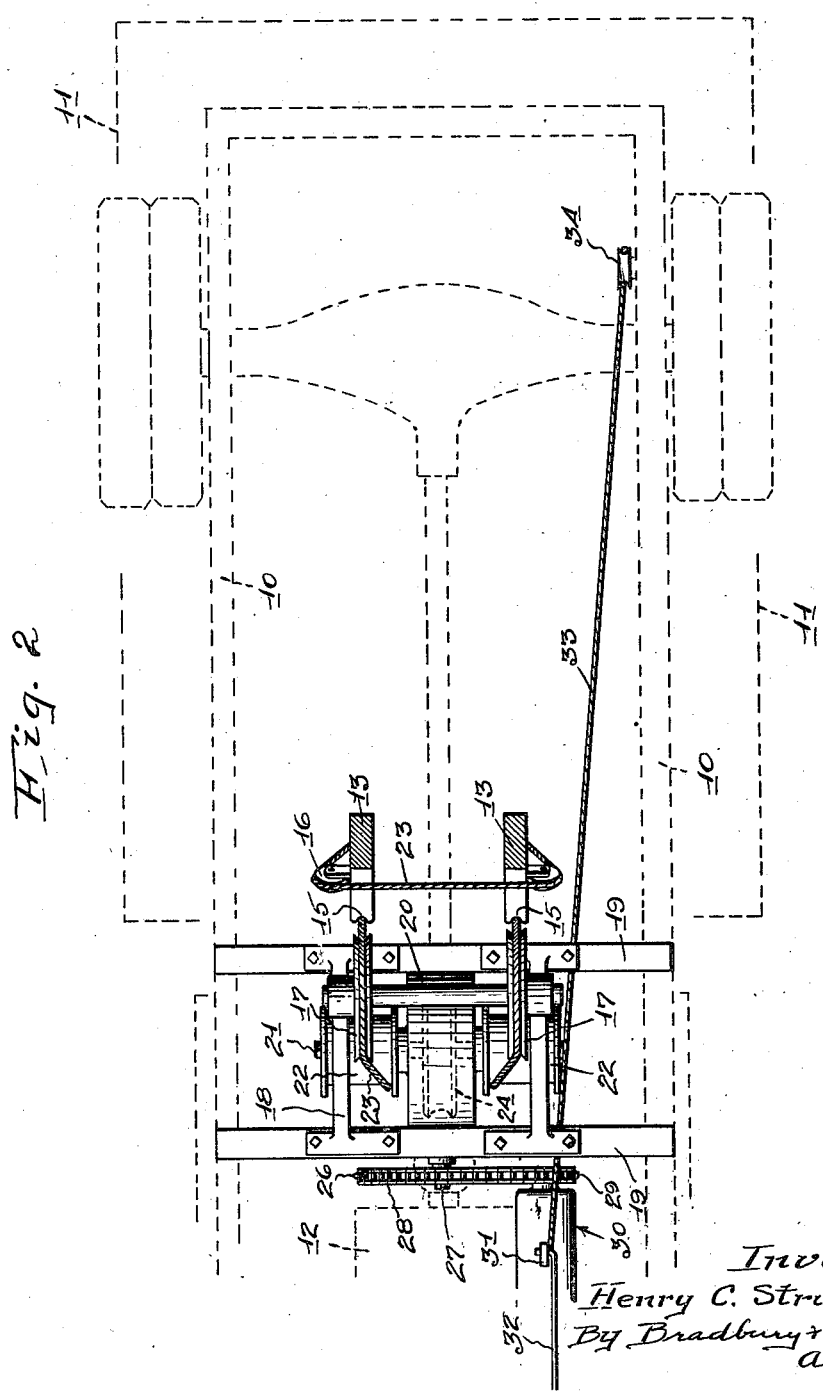

Patented June 26, 1923.

1,459,935

UNITED STATES PATENT OFFICE.

HENRY C. STRUCHEN, OF ST. PAUL, MINNESOTA.

HOIST FOR VEHICLE BODIES.

Application filed July 12, 1920. Serial No. 395,524.

*To all whom it may concern:*

Be it known that I, HENRY C. STRUCHEN, a citizen of the United States, residing at St. Paul, in the county of Ramsey and State of Minnesota, have invented a new and useful Hoist for Vehicle Bodies, of which the following is a specification.

My invention relates to improvements in hoists for vehicle bodies.

Its object is to provide a simple, durable and efficient device of this kind adapted to be readily attached to ordinary self-propelled vehicles carrying dump bodies.

With the foregoing and other objects in view, which will appear in the following description, the invention resides in the novel combination and arrangement of parts and in the details of construction hereinafter described and claimed.

In the drawings, Fig. 1 is a view in elevation illustrating a device embodying my invention and applied to an ordinary vehicle of the dump-body type, said vehicle being illustrated in dotted lines; Fig. 2 is a plan view of the same, parts thereof being broken away to disclose a portion of the structure, which would otherwise be concealed.

Referring to the drawings, I have used the reference numeral 10 to indicate the frame of a vehicle having a tiltable dump body 11 of ordinary design and the usual transmission case 12 enclosing a portion of the vehicle propelling mechanism.

Arms 13 depending from the body 11 are supplied at their lower extremities with sheaves 14. The greater part of the length of each arm is curved through an arc struck from the axis of the pivotal support for the body 11 and the forward edges of said arms are grooved as at 15 to receive the branches of a lifting cable, hereinafter mentioned. A second sheave 16 is mounted near the upper end of each arm 13. Elevated idler pulleys 17 are journaled in standards 18 resting upon beams 19 carried by the frame 10 of the vehicle. A housing 20 also supported upon said beams 19, supplies a revoluble mounting for a shaft 21 carrying two winding drums 22, said drums being fixed upon the ends of said shaft at opposite sides of the housing 20. A lifting cable 23 has one end thereof fixed to one drum and the other end thereof attached to the other drum. Each of the two branches of said cable passes from its drum over an elevated idler pulley 17, thence under the lower sheave 14 on one arm, and thence upward and over the upper sheave 16 on said arm. The sheaves 16 are so arranged that the reach of the cable 23 between said sheaves will clear the vehicle frame 10 in all of the various positions of the body 11.

Driving mechanism for turning the drum shaft 21 in either direction and locking said drum against rotation by the weight of the body, includes a worm wheel 24 fixed to said shaft and a worm 25 in mesh with the worm wheel, said worm and worm wheel, being encased within the housing 20. A large sprocket wheel 26 on the worm shaft 27 is geared through a sprocket chain 28 with a smaller sprocket wheel 29 on the driving shaft of a power take-off device 30, applied to the transmission case 12 of the vehicle. This take-off device is of usual construction and capable of operation in either direction, an actuating lever 31 being supplied and moved, normally, by an operator, through a rod 32 connected with suitable shifting devices. I supply a safety trip for disconnecting the take-off and vehicle propelling mechanisms, when the body is tilted to its maximum height. This trip includes a cable 33 attached at one end to the actuating arm 31 and at its other end to the body 11 of the vehicle at a point slightly removed from the pivotal support for the body, said cable being directed beneath a sheave 34 mounted on the frame 10 below the point of connection between said cable and body.

In use, the forward end of the body is raised by an adjustment of the arm 31 to turn the drums 22 in one direction. Another adjustment of said arm, either through the rod 32 or cable 33, arrests the movement of the body and a third adjustment of said arm results in the rotation of said drums to unwind the cable therefrom and lower the forward end of the body 11. The worm 25 and worm wheel 24 secure the body against falling and the slidable connection of the cable 23 with the arms 13 provides for equalizing the tension between the two reaches of said cable.

Changes in the specific form of my invention, as herein disclosed, may be made within the scope of what is claimed without departing from the spirit of my invention.

Having described my invention, what I claim as new and desire to protect by Letters Patent is:

In a hoist for a tiltable vehicle body, a power take-off device operatively connected with the propelling mechanism of the vehicle, a pair of winding drums journaled on the vehicle frame, driving mechanism between said take-off device and drums adapted to hold the drums against rotation by the weight of the body and to turn said drums in either direction upon engagement of the take-off device with the vehicle propelling mechanism, arms depending from the body, a sheave at the lower extremity of each arm, a sheave near the upper end of each arm and above the frame of the vehicle, a cable having one end thereof attached to one drum and the other end thereof to the other drum, each reach of the cable passing beneath the lower sheave and over the upper sheave of one of said arms, as and for the purposes described.

In testimony whereof, I have signed my name to this specification.

HENRY C. STRUCHEN.